June 6, 1967  W. L. HUSKO ETAL  3,323,830
CONVERTIBLE VEHICLE BODY
Filed Dec. 2, 1965  2 Sheets-Sheet 2
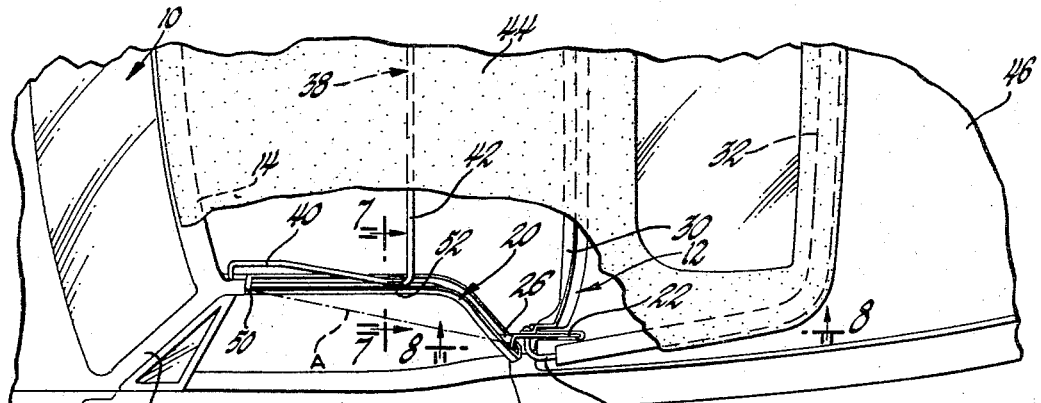
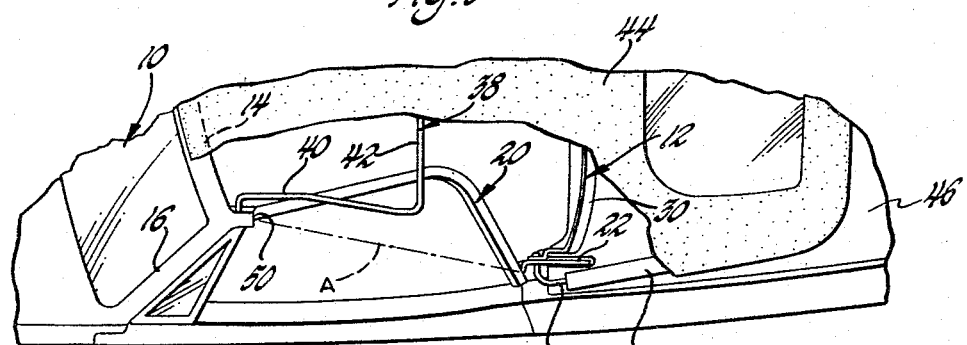
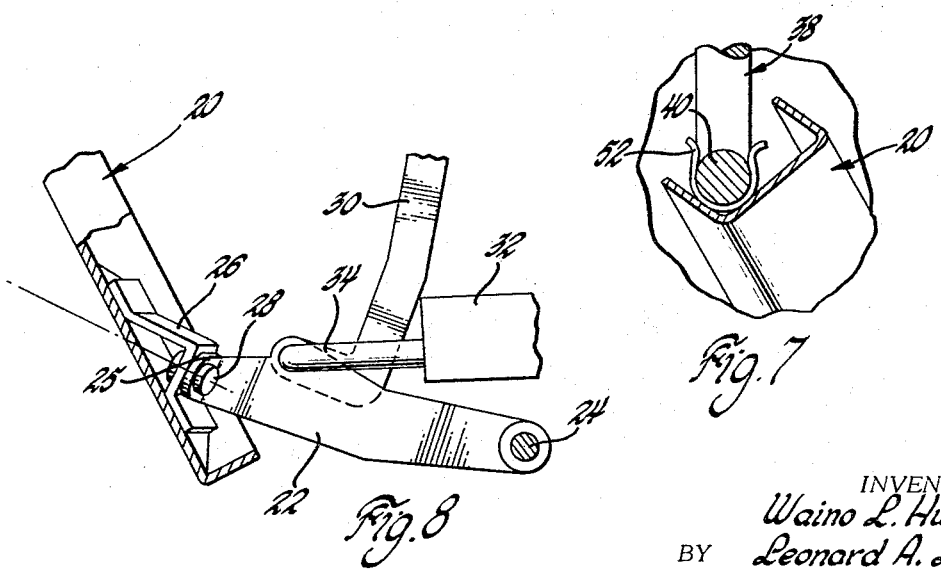
INVENTORS
Waino L. Husko &
BY Leonard A. Lystad
W. S. Pettigrew
ATTORNEY

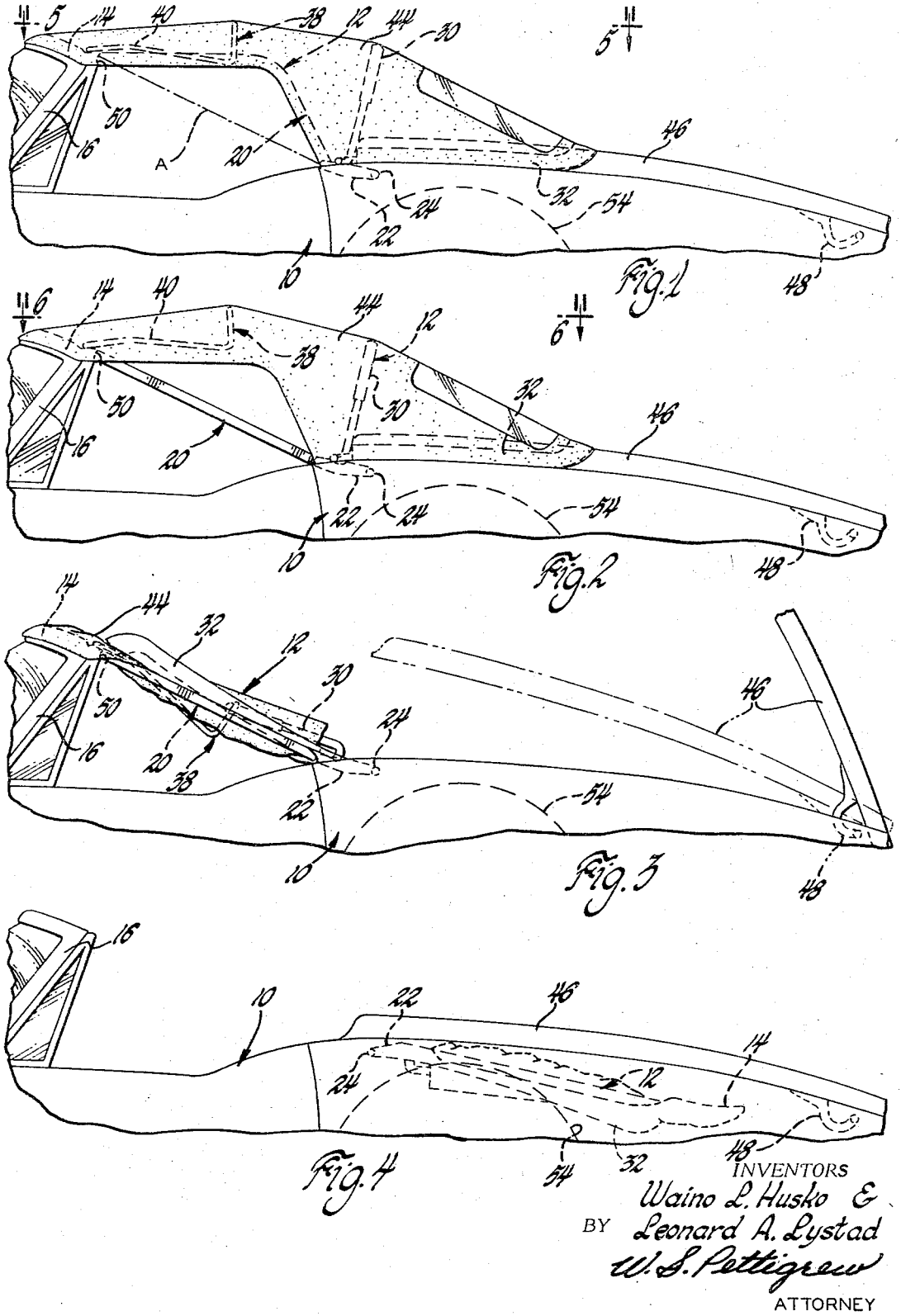

3,323,830
CONVERTIBLE VEHICLE BODY
Waino L. Husko, Detroit, and Leonard A. Lystad, Warren, Mich., assignors to General Motors Corporation, Detroit, Mich., a corporation of Delaware
Filed Dec. 2, 1965, Ser. No. 511,121
5 Claims. (Cl. 296—116)

This invention relates to convertible vehicle bodies and more particularly to folding top structures for convertible vehicle bodies.

One feature of this invention is that it provides a new and improved folding top frame structure for a convertible vehicle body. Another feature of this invention is that it provides a folding top frame structure including simplified spaced side rail components each formed of a single elongated member of dog leg or semi-arched configuration. A further feature of this invention is that the dog leg side rail members are each swingably mounted on the body to be transversely inwardly foldable relative thereto about a generally longitnudinal axis of the body from top raised position to a generally transversely disposed position and thereafter swung longitudinally of the body into a top receiving well to lay flat therewithin with a minimum of stack height and interference with surrounding body structure.

These and other features and advantages of the invention will be readily apparent from the following specification and from the drawings wherein:

FIGURE 1 is a fragmentary elevational view of a convertible vehicle body including a folding top frame structure according to this invention shown in fully raised position;

FIGURE 2 is a view similar to FIGURE 1 showing the one-piece side rails of the frame in their intermediate transversely inwardly retracted position;

FIGURE 3 is a view similar to FIGURE 1 showing the folding top frame in a fully folded position;

FIGURE 4 is a view similar to FIGURE 1 showing the folding top frame in fully lowered position within the top receiving well of the body;

FIGURE 5 is a partially broken away fragmentary top plan view showing the folding top frame in the position of FIGURE 1;

FIGURE 6 is a view similar to FIGURE 5 with the folding top in the position of FIGURE 2;

FIGURE 7 is an enlarged sectional view taken generally along the plane indicated by line 7—7 of FIGURE 5; and FIGURE 8 is a partially broken away enlarged sectional view taken generally along the plane indicated generally by line 8—8 of FIGURE 5.

Referring more particularly to the drawings, the invention is shown and described in the environment of a low silhouette sports-type convertible vehicle body designated generally as 10. Further, the illustrated folding top structure embodying the invention is generally of the type accorded the term "one-man" folding top, in that the particular features of construction thereof are adapted to convenient manual raising and lowering by a single operator.

Having now specific reference to FIGURES 1 and 5, a folding top frame according to this invention, designated generally as 12, includes a transverse header member 14 adapted for sealing engagement in fully raised position with the windshield supporting pillar and header structure 16 of the body, and for latching thereto as by any conventional means, not shown. The frame 12 further includes a pair of elongated one-piece side rails 20 of channel cross section, each extending at a respective side of the body from header 14 fully the length of the passenger compartment to a rearward pivotal mounting described below. Only one side of the frame with its respective side rail 20 is shown, but it will be understood that the other side is similar to that shown and differs only as to hand. As is apparent, side rail 20 is formed with a dog leg or semi-arch above the body belt line to provide the required passenger door entrance height.

Referring to FIGURES 1, 5 and 8, the rearward pivotal mounting for each side rail 20 includes a mounting member or link 22 having one end thereof pivotally mounted at 24 to the inner panel structure of the body adjacent its belt line, the axis of pivot 24 extending generally horizontal and transverse of the body. The other end of the link is provided with a bent seating flange 25 adapted to rotatably support an angled mounting bracket 26 welded or otherwise secured within side rail 20 adjacent the lower end thereof, and a headed pivot stud 28 rotatably secures the flange and bracket together. Adapted for further mounting to the link 22 are the respective ends of a transverse No. 2 bow 30 and a transverse No. 3 or deck bow 32. As seen best in FIGURES 5 and 8, the terminal end of bow 32 is formed of a bent rod like portion 34 which is inserted within a mounting bore of link 22 and further received within an aligned bore in the adjacent end of bow 30, with the end of portion 34 being headed over to rotatably secure both bows to the link. Bows 30 and 32 are otherwise of generally conventional arched configuration and require no further particular description, except to say that bow 32 is adapted for flush engagement with the deck panel or lid of the body when the folding top is fully raised. Suitable conventional latch means may be provided on the bow 32 and the deck lid for releasable securement therebetween in the fully raised position of the folding top.

As seen in FIGURES 1 and 5, the frame 12 further includes a rod like No. 1 bow 38 having opposite leg portions 40 each being suitably rotatably mounted at its terminal forward end to a respective side of header 14. The transverse portion 42 of the bow cooperates in conventional manner with bows 30 and 32 to tension the conventional top fabric member 44 thereover when the folding top is in fully raised position.

It is to be noted that by the described rotatable mounting arrangement of bows 30 and 32 on link 22, these bows are swingable relative thereto forwardly of the body from the position of FIGURE 1 to a position wherein an adjacent portion of the deck structure of body 10 may be opened for subsequent retraction of the folding top into a top receiving well. In the style of vehicle body shown herein, the top receiving well extends substantially the length of the deck for reception of frame 12 as will be described, and accordingly, a full length deck lid 46 of the body is hinged at 48 adjacent its rearward extremity to provide for full opening to the deck compartment thereunder for either folding top retraction or luggage storage.

In accordance with a principal feature of the invention, each side rail 20 is adapted for an initial retraction or folding movement transversely inwardly of the body from the fully raised position of FIGURES 1 and 5 to an intermediate position disposed flat in a generally transverse plane of the body, as shown in FIGURES 2 and 6. To provide for such folding, stud 28 on link 22 is complemented by a similar pivotal mounting or interconnection at 50 of the forward end of side rail 20 to header 14, not shown in detail. These two pivotal mountings for each side rail define a swinging axis A therefor directed longitudinally of the body and somewhat upwardly inclined as indicated in FIGURE 1.

To releasably hold each side rail 20 in fully raised position, there is provided cooperative clamping means between the side rail and bow 38 in the form of a resilient channel-shaped member 52 welded or otherwise secured at an appropriate location within the side rail to clampingly engage the leg 40 of the bow, FIGURES 5 and 7. Only moderate upward or downward manual pressure is required to rotate bow 38 accordingly to either engage or disengage bow 38 with or from members 52 whereby the side rails are either held in fully raised position or released for the folding top retraction or lowering movement now to be described.

Referring to FIGURES 1 through 4, the complete sequence of folding top retraction includes the aforedescribed first step of manually releasing bow 38 from clamping members 52 to allow inward and downward swinging movement of each side rail 20 about axis A from the fully raised position of FIGURE 1 to the transversely inwardly retracted position of FIGURE 2. Bow 32, after release of whatever deck latch means provided thereon, is thereupon manually swung with bow 30 forwardly relative to links 22 to fold fabric 44 and to fall into closely nested relation with the retracted side rails 20 and header 14 as indicated in FIGURE 3. The latch means between header 14 and windshield structure 16 are then released, the deck lid 46 is raised to a fully opened position indicated in full lines in FIGURE 3, and finally the entire folding top, including the links 22, is manually swung rearwardly about pivots 24 of the links to the fully lowered position of FIGURE 4 and the deck lid 46 is lowered to closed position. In fully lowered position, the dog leg portions of side rails 20 lay flat or horizontal within the deck compartment and do not interfere with body structure therein such as the wheelhouse 54. The reverse of the above-described sequence for raising the folding top is belived obvious from the foregoing and will not be discussed.

It is apparent that this invention provides a new and improved folding top frame structure having minimum vertical stack height dimensions when retracted into the top receiving well, thereby to allow for an extremely low silhouette vehicle body. Each dog leg side rail or a primary portion thereof is formed in one-piece construction rather than in the usual multiple longitudinally foldable sections which require added stacking space in the top receiving well and which add to the parts and complexity of the frame. It is further apparent that, notwithstanding such one-piece construction, the dog leg or semi-arch of the side rails herein presents no compactness problem or interference with internal body structure in the top receiving well or deck compartment. The principles of the invention are of course broadly applicable to various types of folding top structures and are not limited to the specific manual version shown herein.

Having thus described our invention, what is claimed is:

1. In a convertible vehicle body, a folding top frame mounted on the body for movement about a transverse first axis, said frame including a side rail extending longitudinally of said body, first means pivotally connecting the forward end of said side rail to said frame, second means pivotally connecting the rearward end of said side rail to said frame, said first and second means defining a second axis of swinging movement extending longitudinally of said body therebetween, said side rail being swingable about said second axis transversely of said body from a raised position to an intermediate retracted position disposed inboard of the body and being swingable longitudinally of said body with said frame about said first axis between said intermediate retracted position and a lowered position.

2. A folding top frame as recited in claim 1 wherein said side rail is of generally dog leg configuration, said side rail being disposed flat in generally horizontal planes of said body when in the intermediate retracted and the lowered position thereof.

3. A folding top frame as recited in claim 1 and further including cooperative releasable securing means on said frame and said side rail for holding the latter in the raised position thereof.

4. A folding top frame as recited in claim 1 and further including a transverse body engaging header member having said forward end of said side rail pivotally connected thereto, and wherein said second means includes a mounting member swingably mounted on said body for movement about said first axis, said mounting member mounting said frame on said body and pivotally mounting the rearward end of said side rail on said frame.

5. A folding top frame structure according to claim 3 wherein said frame includes a bow member and said releasable means secures said bow member to said rail to hold said side rail in the raised position thereof.

References Cited

UNITED STATES PATENTS 2,747,928    5/1956    Oliver et al. _____ 296—107
2,860,913    11/1958    Kuiper et al. _____ 296—107

FOREIGN PATENTS 814,396    9/1951    Germany.

BENJAMIN HERSH, *Primary Examiner.*

C. C. PARSONS, *Assistant Examiner.*